United States Patent
Sun et al.

(10) Patent No.: US 10,402,587 B2
(45) Date of Patent: Sep. 3, 2019

(54) APPLICATION-LEVEL IN-PLACE ENCRYPTION

(71) Applicant: SAP SE, Walldorf (DE)

(72) Inventors: Xun Sun, Shanghai (CN); Yu Wu, San Francisco, CA (US); Xiaoxiao (Jerome) Gu, Shanghai (CN); Yukching Leung, San Francisco, CA (US)

(73) Assignee: SAP SE, Walldorf (DE)

( * ) Notice: Subject to any disclaimer, the term of this patent is extended or adjusted under 35 U.S.C. 154(b) by 163 days.

(21) Appl. No.: 15/830,748

(22) Filed: Dec. 4, 2017

(65) Prior Publication Data

US 2019/0171843 A1    Jun. 6, 2019

(51) Int. Cl.
| | |
|---|---|
| *G06F 21/62* | (2013.01) |
| *H04L 9/06* | (2006.01) |
| *G09C 1/00* | (2006.01) |
| *H04L 9/08* | (2006.01) |

(52) U.S. Cl.
CPC ........... *G06F 21/6245* (2013.01); *G09C 1/00* (2013.01); *H04L 9/0618* (2013.01); *H04L 9/0631* (2013.01); *H04L 9/0861* (2013.01)

(58) Field of Classification Search
CPC ....... G06F 21/62; G06F 21/6245; H04L 9/065
See application file for complete search history.

(56) References Cited

U.S. PATENT DOCUMENTS

| | | | | |
|---|---|---|---|---|
| 2011/0296238 A1* | 12/2011 | Abzarian | ................ | G06F 21/72 714/16 |
| 2012/0173882 A1* | 7/2012 | Horn | ........................ | G06F 21/78 713/189 |
| 2017/0170952 A1* | 6/2017 | Hart | ........................ | H04L 9/0618 |
| 2018/0053008 A1* | 2/2018 | Busch | ................... | H04L 9/0618 |
| 2019/0108357 A1* | 4/2019 | Iyer | ..................... | G06F 21/6218 |

* cited by examiner

*Primary Examiner* — Ponnoreay Pich
(74) *Attorney, Agent, or Firm* — Buckley, Maschoff & Talwalkar LLC (57) ABSTRACT

A method includes obtaining first text information in a first format, converting the first text information to an offset value from a base time in a second format, generating an encryption key, encrypting the offset value with the encryption key to produce an encrypted offset value in the second format, converting the encrypted offset value to second text information in the first format, and outputting the second text information as encrypted text corresponding to the first text information.

20 Claims, 7 Drawing Sheets

APPLICATION-LEVEL IN-PLACE ENCRYPTION

BACKGROUND

Nearly every organization acquires, processes, and stores highly sensitive records. Among these records is confidential information such as personally identifiable information (PII) and business secrets. There is a legal and consumer-wide requirement to encrypt sensitive data that is stored, for example, in relational databases. Organizations are expected to closely guard this private data and manage access appropriately.

Security of data is typically achieved through encryption of the data. Data encryption achieves confidentiality by translating information from its original form (plaintext) into an encoded, unintelligible form (ciphertext). An encryption scheme is a tuple of three algorithms: key generation (KeyGen), encryption, and decryption. KeyGen is a randomized key generation algorithm used to generate keys. A key is a piece of information that determines the functional output of a cryptographic algorithm. For encryption algorithms, the key specifies the transformation of plaintext into ciphertext, and vice versa for decryption algorithms. KeyGen takes as input a security parameter and outputs an encryption key. The security parameter specifies a security strength of the generated key (e.g., as a bit-length of the key). The encryption algorithm takes as input a message (e.g., in plaintext) and a key, and outputs an encrypted message (e.g., ciphertext). The decryption algorithm takes as input the encrypted message and a key, and outputs the original message (e.g., in plaintext). In the case of symmetric encryption, the same cryptographic key (e.g., symmetric key) is used for both the encryption of plaintext and the decryption of ciphertext.

However, significant work is required to add encryption features to systems (e.g., a legacy systems) that are not designed to handle it. In most cases, when encryption is added to legacy systems, technical challenges are presented in that database schemas would need to be changed and back-end validation rules reimplemented. In the case of a "Date" field, for example, an original "Date" field will be encrypted with a block cipher into a 128-bit randomized string, so the data type for the "Date" field will need to change from date to blob (e.g. sequence of bits).

The typical approach to encryption is to serialize plaintext data into an array of bytes, split the byte array into blocks as specified by the encryption algorithm (e.g., 8-byte blocks for DES and 3DES, 16-byte blocks for AES, etc.), and encrypt the blocks in a secure mode of operation (e.g., Cipher Block Chaining (CBC), Galois Counter Mode (GCM), etc.). Block ciphers such as Advanced Encryption Standard (AES) or Data Encryption Standard (DES) operate on fixed-length groups of bits (e.g., size 128-bit block).

For example, a block cipher encryption algorithm might take a 128-bit block of plaintext as input, and output a corresponding 128-bit block of ciphertext using a secret key. Therefore, if an original field is a 1-byte short message, the data type for the field will need to change into a 128-bit block. The resulting ciphertext would be of a binary blob data type whose format cannot be related back to plaintext. Therefore, the schema database must change, and in most cases, expand in size. This on one hand is a waste of storage space and on the other hand would require widespread changes to the legacy system to accommodate the new data type.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to application-level in-place encryption for sensitive information (e.g., personally identifiable information (PII) data), and more specifically, to application-level in-place encryption for date and time related database fields. It is contemplated that the techniques described may be extended to other implementation contexts (e.g., other data types).

For the purposes of this disclosure, PII data is information that can be used to uniquely identify an individual. In some embodiments, an individual may be a person, an organization, a group, and/or business entity. In some implementations, an individual can be a collection of individuals. PII data may also encompass information that can be used to contact or locate the individual or information that can be used with other sources to identify, contact, or locate the individual. Various laws and regulations to address PII data security exist and vary across geo-political boundaries. Examples of PII data could include name, address, telephone number, birthdate, birthplace, biometric data, email address, Social Security number, passport number, driver's license number, session initiation protocol uniform resource identifier (SIP URI), credit card number, bank account number, a username, an account name, and/or other suitable data that can be used to identify, contact, and/or locate the individual.

For the purposes of this disclosure, "in-place" encryption refers to an encryption scheme where the schema data type for a data field does not need to change to support encryption. The in-place encryption scheme includes a tuple of algorithms: key generation (KeyGen), encryption, and decryption. Additionally, the in-place encryption scheme has a format-preserving property whereby the format of the output ciphertext is the same as the format of the original input plaintext. Thus, for example, 32-bit integers will encrypt to 32-bit integers, and a date in a "Date" field will encrypt into another date.

One of the advantages of in-place encryption, as opposed to other types of encryption, is that the storage overhead incurred by conventional symmetric encryption schemes is avoided. Another advantage of in-place encryption is that back-end validation rules (e.g., on a database data type) are preserved and will keep working. For example, back-end validation rules implemented on email addresses to assert format on an email address field will continue to work because the ciphertext of an email address is still an email address. Furthermore, with in-place encryption, multiple plaintexts may be processed with the same key.

Figure 1:
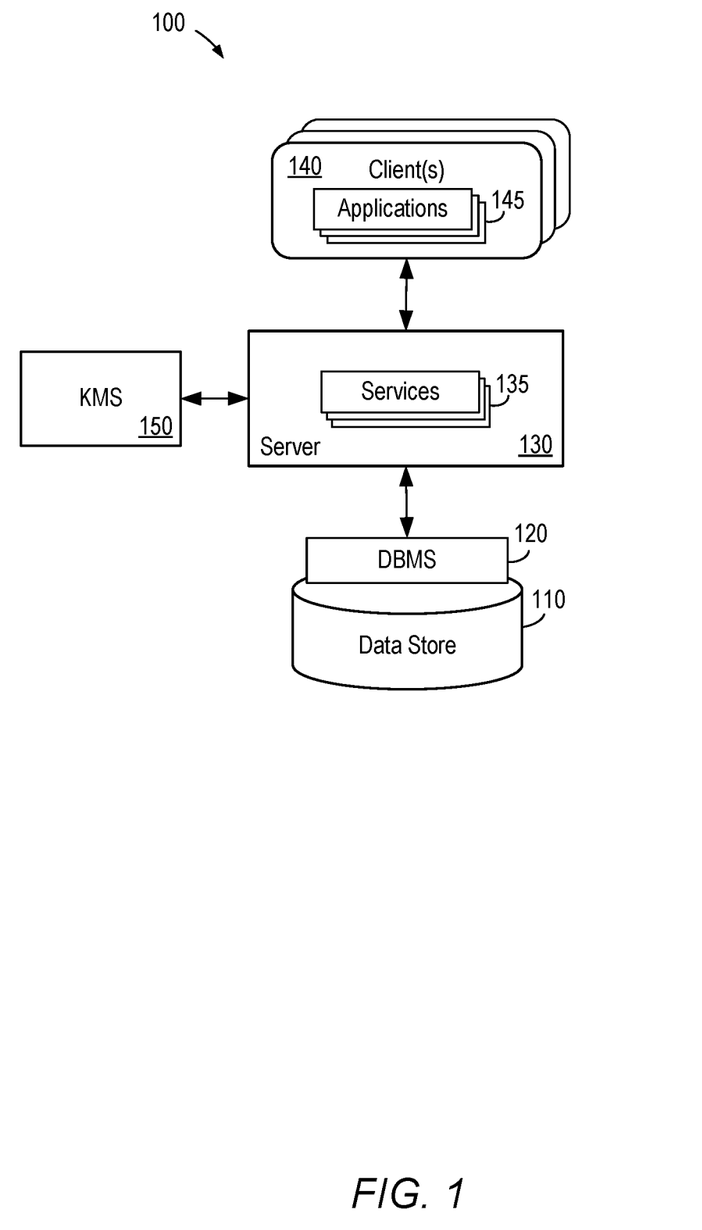
FIG. 1 is a block diagram of an overall system architecture according to some embodiments.

FIG. 1 is a block diagram of an overall system architecture 100 according to some embodiments. Embodiments are not limited to architecture 100 or to a database architecture.

Architecture 100 includes data store 110, database management system (DBMS) 120, server 130, services 135, client(s) 140, applications 145, and key management service (KMS) 150. Generally, services 135 executing within server 130 receive requests (e.g., queries) from applications 145 executing on client(s) 140 and provides results to applications 145 based on data stored within data store 110. The client 140 may include any type of computing device such as a laptop, a tablet, a mobile phone, an appliance, a desktop computer, and the like.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to client(s) 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user operates the user interface to request certain data, and the application 145 passes a query based on the request to one of services 135. An SQL script is generated based on the query and forwarded to DBMS 120. DBMS 120 executes the SQL script to return a result set based on data of data store 110, and the application 145 generates and displays a report/visualization based on the result set.

The above operation may leverage a set of objects defined by metadata stored within data store 110 and/or a separate metadata repository (not shown). The metadata is used to execute the query with respect to the corresponding physical entities (e.g., a physical database table, associated columns of one or more database tables, etc.) of data store 110.

Server 130 provides any suitable protocol interfaces through which applications 145 executing on client(s) 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any client(s) 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an in-memory database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

KMS 150 securely manages encryption keys for encryption and decryption.

Figure 2:
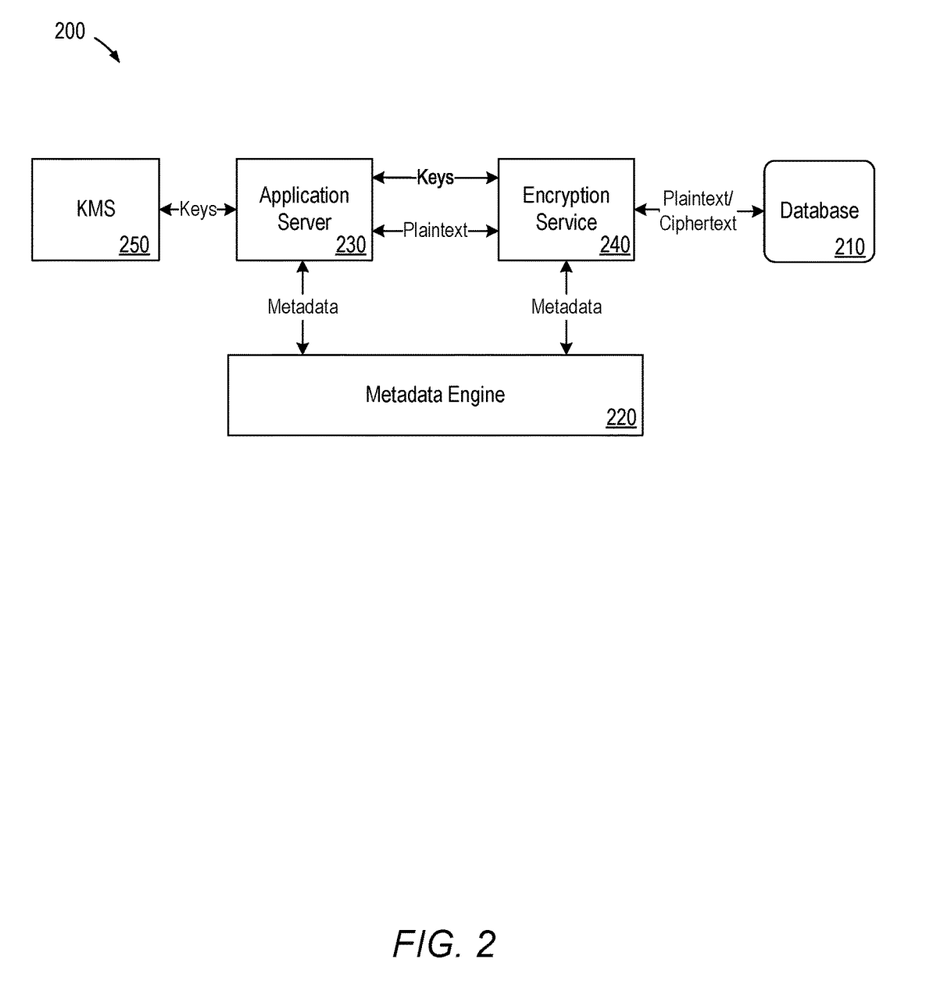
FIG. 2 is more detailed block diagram of the system of FIG. 1 in which illustrative subcomponents of the system and their relationships to each other are shown.

FIG. 2 is a more detailed block diagram of the system of FIG. 1 in which illustrative subcomponents of the system and their relationships to each other are shown.

Architecture 200 includes database 210, application server 230, and KMS 250, which correspond, respectively, to data store 110, server 130, and KMS 150 in FIG. 1 and are generally as described above with respect to FIG. 1. Database 210 stores data, application server 230 runs the business logic and makes sense of data, and KMS 250 manages lifecycle of keys used in the system. Architecture 200 also includes metadata engine 220 and data encryption service 240. In exemplary embodiments, the application may be wholly or partially driven by metadata (data that describes other data). Metadata engine 220 stores and manages metadata that associates data with keys. Encryption service 240 provides various services related to the management of the data encryption of resources including encrypting/decrypting data based on metadata.

Applications 145 maintain metadata for use in the in-place encryption scheme. In some embodiments, the metadata allows users/applications 140 to specify, for example, which fields of a given table should be encrypted, which key is used for the encryption, and when the encryption key should be expired and rotated. For purposes of illustration, the following table lists metadata information related to employee information:

| Field_name | Encrypted | Key_id | Key_expiration |
| --- | --- | --- | --- |
| name | true | symmetric_key_id_0001 | Thu, 31 Dec. 2017 23:59:59 UTC |
| phone_number | true | symmetric_key_id_0002 | Thu, 31 Dec. 2017 23:59:59 UTC |
| email | true | symmetric_key_id_0003 | Thu, 31 Dec. 2017 23:59:59 UTC |
| birthdate | true | symmetric_key_id_0004 | Thu, 31 Dec. 2017 23:59:59 UTC |
| college | false | NULL | NULL |

Data storage and encryption operates as follows. Application server 230 stores data in database 210 by sending plaintext data through encryption service 240. Encryption service 240 determines from metadata whether the data should be encrypted or not before storing it in the database 210. If it is determined that the data should not be encrypted, the plaintext data is forwarded to the database 210 as-is, and the remaining actions described in this paragraph are skipped. If it is determined that the data should be encrypted, encryption service 240 checks for a data encryption key corresponding to a key ID (an identifier for the key being used to encrypt the plaintext data) in cached memory. If the matching encryption key is found, the encryption service 240 retrieves the key ID and encryption configuration from the metadata engine 220. If the encryption key corresponding to the key ID is not found in memory, encryption service 240 retrieves the key from KMS 250 through application server 230. After retrieving or deriving the key, encryption service 240 encrypts the data using the specified key and configuration. Encryption service 240 sends the resulting ciphertext to database 210 and stores those values in database 210 (or other data storage device).

Data retrieval and decryption operates as follows. Application server 230 retrieves data from database 210 by sending a request through encryption service 240. Encryption service 240 determines from metadata whether the data is encrypted or not. If it is determined that the data is not encrypted, the data is returned to the application server 230 as-is, and remaining actions described in this paragraph are skipped. If it is determined that the data is encrypted, encryption service checks for a data decryption key corresponding to a key ID (an identifier for the key being used to decrypt the ciphertext data) in cached memory. If the matching decryption key is found, the encryption service 240 retrieves the key ID and decryption configuration from the metadata engine 220. If the decryption key corresponding to the key ID is not found in memory, encryption service 240 retrieves the key from KMS 250 through application server 230. After retrieving or deriving the key, encryption service 240 decrypts the data using the specified key and configuration and returns resulting plaintext data to application server 230.

Key expiration/refresh operates as follows. When a key expires, application server 230 sends a request to KMS 250 to generate a new key. This new key can be an entirely new key separate from the expired key or a new version of the expired key. Application server 230 sends the new key to encryption service 240. For each table row previously encrypted using the expired key, data is decrypted with the expired key and encrypted with the new key. New ciphertext is stored in database 210 to replace old ciphertext. Metadata is updated to reflect the new key.

Figure 3:
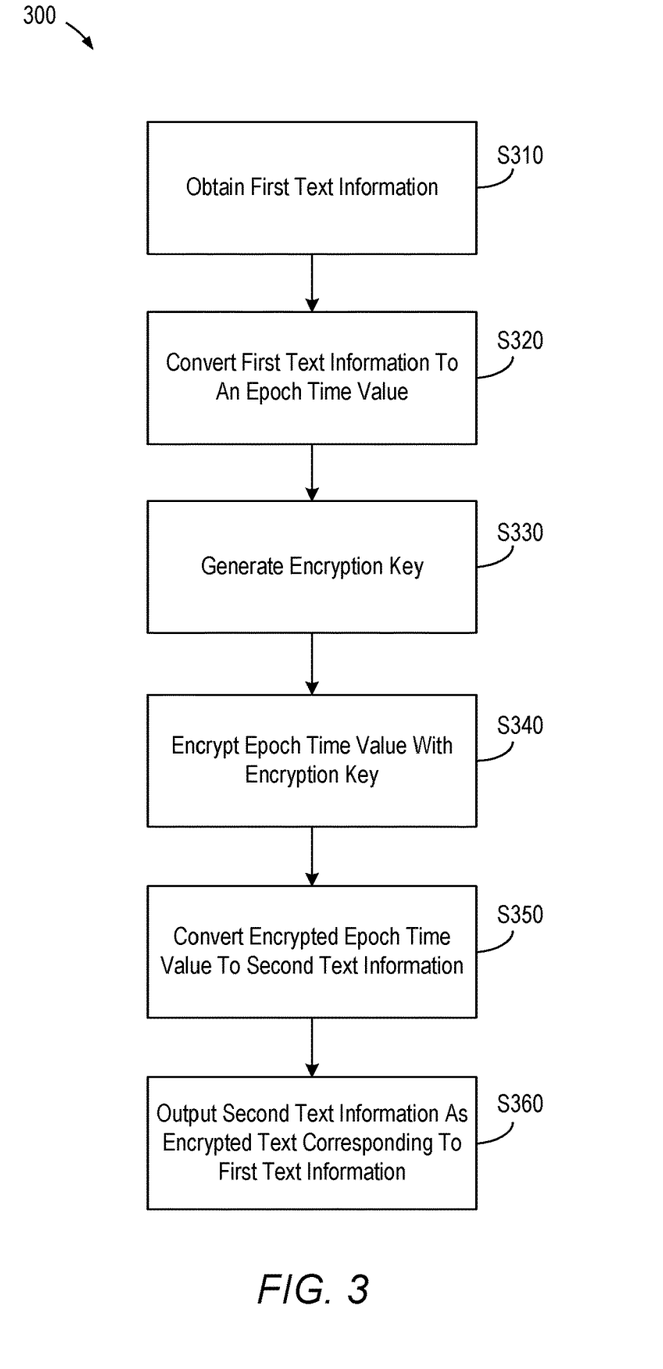
FIG. 3 is a flow diagram illustrating an exemplary process according to some embodiments.
Figure 4:
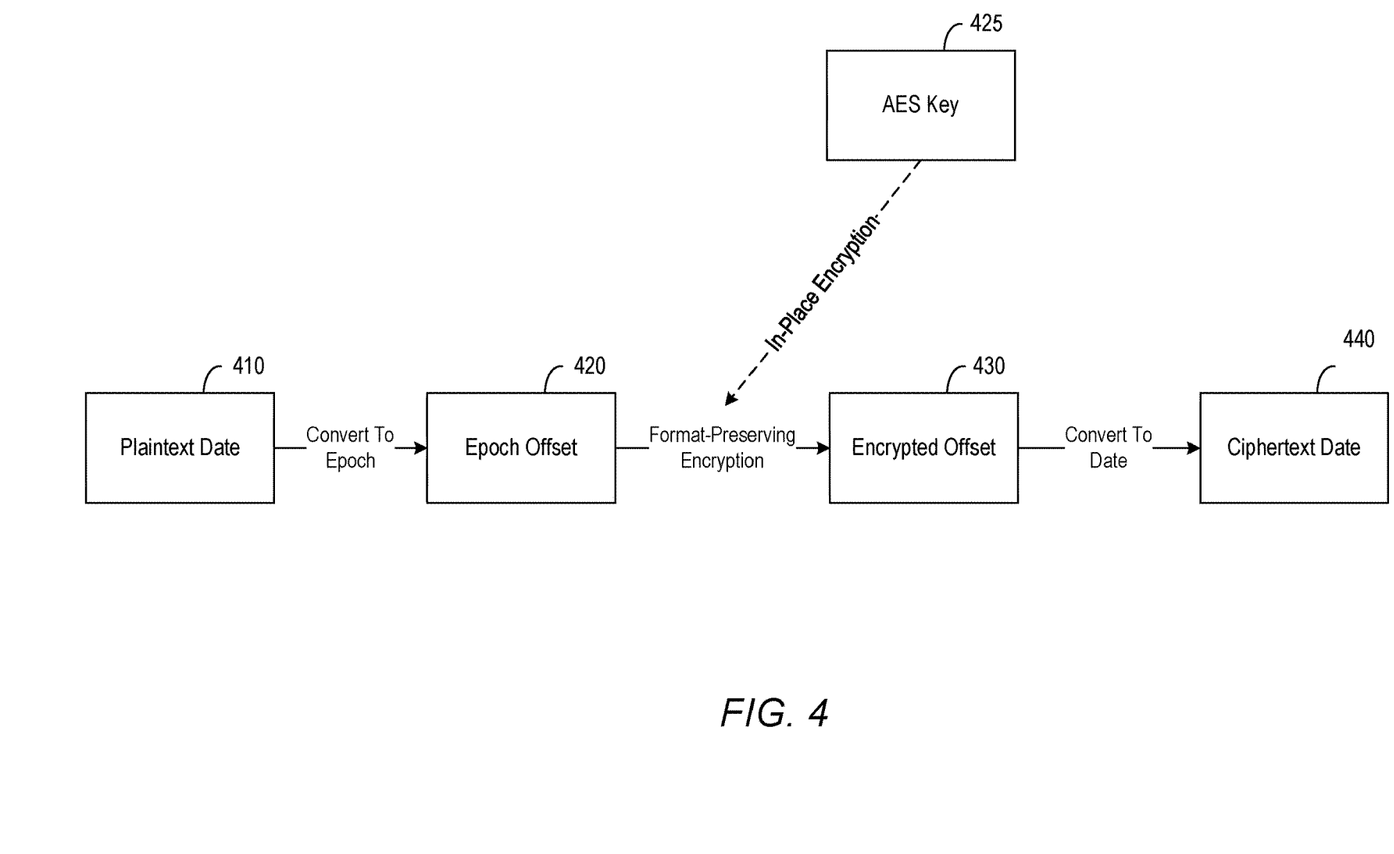
FIG. 4 is a sequence diagram of a use case according to some embodiments.
Figure 5:
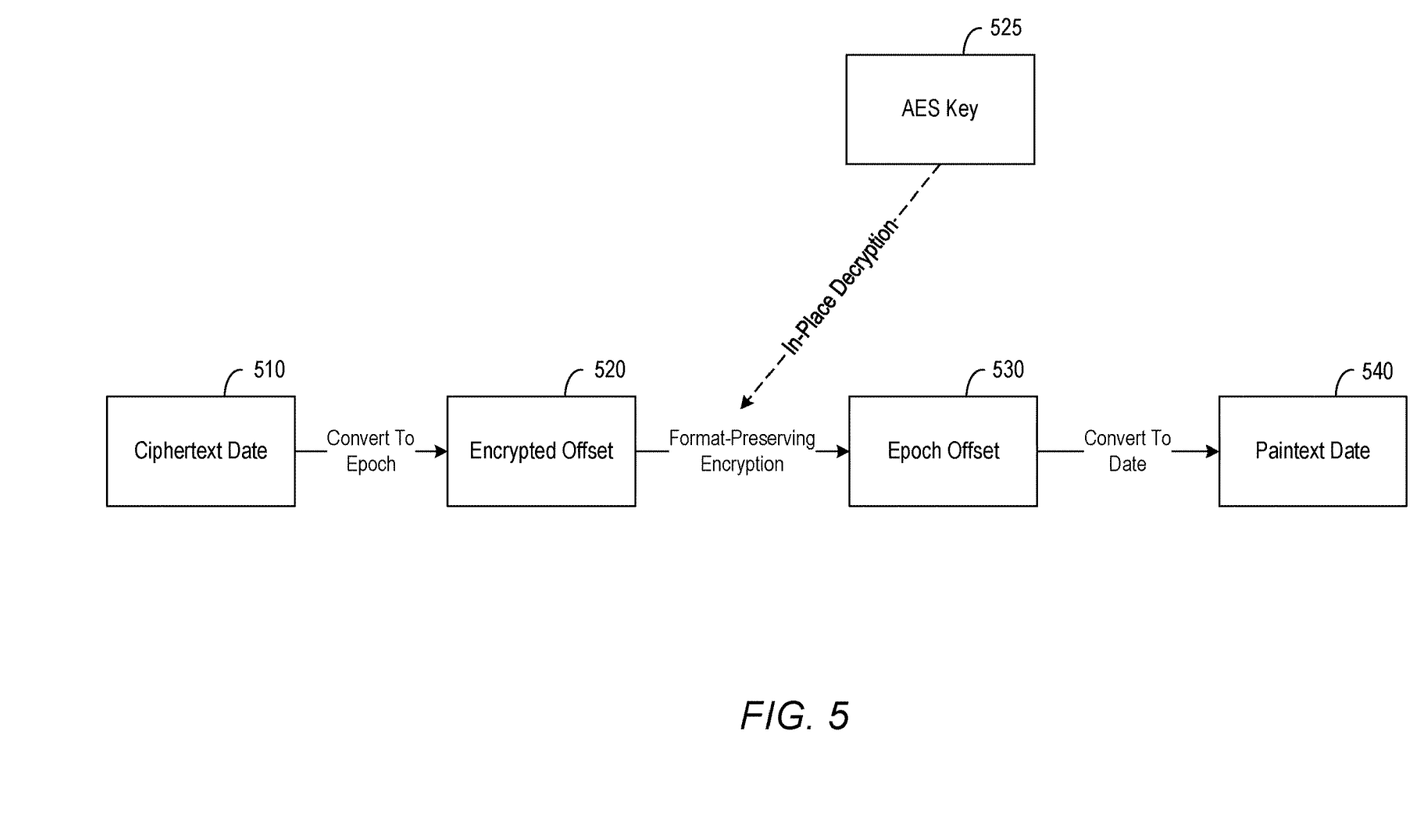
FIG. 5 is a sequence diagram of a use case according to some embodiments.
Figure 6:
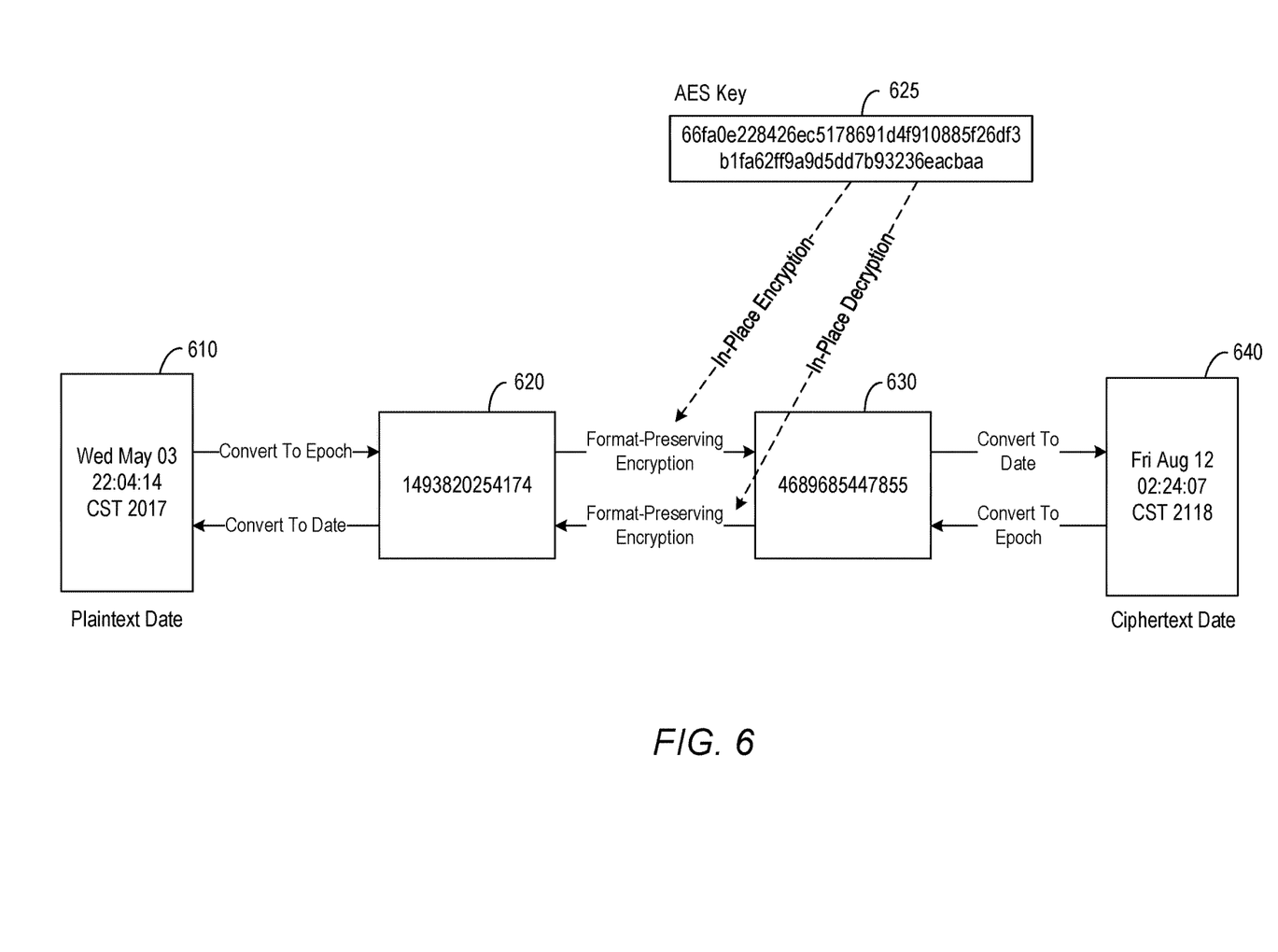
FIG. 6 is a more detailed sequence diagram of the use cases of FIGS. 4 and 5 in which illustrative values are shown.

FIGS. 3 through 6 will be discussed together. FIG. 3 is a flow diagram illustrating an exemplary process 300 according to some embodiments. FIG. 4 is a sequence diagram of a use case according to some embodiments. More specifically, FIG. 4 illustrates an example embodiment implementing in-place encryption for "Date" fields. FIG. 5 is a sequence diagram of a use case according to some embodiments. More specifically, FIG. 5 illustrates an example embodiment implementing in-place decryption for "Date" fields. FIG. 6 is a more detailed sequence diagram of the use cases of FIGS. 4 and 5 in which illustrative values are shown.

Initially, at S310, encryption service 240 obtains first text information from application server 230 and determines based on metadata that the first text information should be encrypted. In some embodiments, the first text information is PII data. The PII data can vary in data type. For example, a user's first name and last name are of type "string", salary is of type "integer", and birthdate is of type "date". For purposes of illustration, described in detail below is an in-place encryption scheme for date (and time) fields. The in-place encryption framework for other data types/formats functions in the same or similar manner.

In one example embodiment, the first text information corresponds to a plaintext date 410, such as "Wed May 03 22:04:14 CST 2017", at 610. Next, at S320, the first text information 410 is converted to an epoch time value 420, such as "1493820254174", at 620.

As used herein, the epoch time value should be understood to refer to an integer (e.g., hexadecimal number) that represents a number of milliseconds that have elapsed since a base time or an epoch. For example, according to Unix time, each point in time is expressed as a difference, measured in milliseconds, between the point in time and midnight, 00:00:00 Coordinated Universal Time (UTC), Thursday, 1 Jan. 1970 (e.g., Unix epoch time). In the illustration of FIG. 6, on "Wed May 03 22:04:14 CST 2017", the epoch offset/time value is "1493820254174".

An encryption key is generated at S330. In one example embodiment, the encryption key corresponds to a 256-bit random number (e.g., 256-bit AES key) 425, such as "66fa0e228426ec5178691d4f910885f26df3b1fa62ff9a9d5d d7b93236eacbaa", at 625. The encryption key 425, 625 is used, at S340, to encrypt the epoch time value using a format-preserving encryption (e.g., FF3 base-10 format-preserving encryption algorithm as promulgated by National Institute of Standards and Technology (NIST)) to produce an encrypted offset 430, such as "4689685447855," at 630.

In turn, at S350, the encrypted epoch time value 630 is converted to second text information. In one example embodiment, the second text information corresponds to a ciphertext date 440, such as "Fri Aug. 12 02:24:07 CST 2118", at 640. The encryption method takes a plaintext "Date" field having data type "date" and an AES key as inputs, and outputs, at S360, another "Date" object (also having data type "date") as the ciphertext date corresponding to the plaintext date. In this way, second text information is output as encrypted text corresponding to the first text information. Advantageously, the first text information and the second text information are of the same data type or format. In some embodiments, the first text information and the second text information are of the same length.

FIG. 5 illustrates an example embodiment implementing in-place decryption for "Date" fields. The in-place decryption sequence 510 through 540 works in reverse of 410 through 440 and outputs the original plaintext date 540. FIG. 6 illustrates a more detailed sequence diagram of the in-place decryption method of FIG. 5 in which illustrative values are shown, which works in reverse of the in-place encryption method. The decryption method takes a ciphertext "Date" field having data type "date" 510, 640 and an AES key 525, 625 as inputs, and outputs another "Date" object (also having data type "date") 540, 610 that is the corresponding plaintext.

Figure 7:
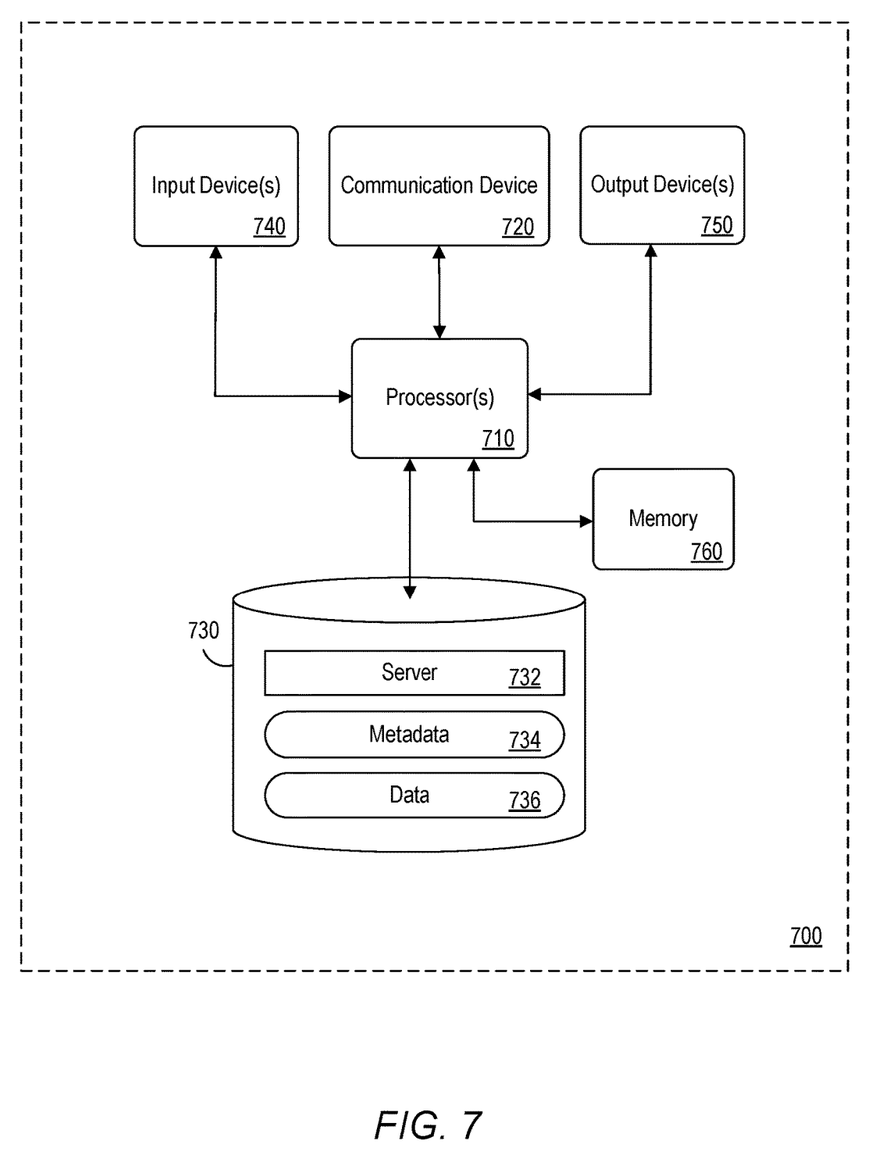
FIG. 7 is a block diagram of an apparatus according to some embodiments.

FIG. 7 is a block diagram of apparatus 700 according to some embodiments. Apparatus 700 may comprise a general- or special-purpose computing apparatus and may execute program code to perform any of the functions described herein. Apparatus 700 may comprise an implementation of one or more elements of architectures 100 and 200. Apparatus 700 may include other unshown elements according to some embodiments.

Apparatus 700 includes processor 710 operatively coupled to communication device 720, data storage device 730, one or more input devices 740, one or more output devices 750, and memory 760. Communication device 720 may facilitate communication with external devices, such as an application server 732. Input device(s) 740 may comprise, for example, a keyboard, a keypad, a mouse or other pointing device, a microphone, knob or a switch, an infrared (IR) port, a docking station, and/or a touch screen. Input device(s) 740 may be used, for example, to manipulate graphical user interfaces and to input information into apparatus 700. Output device(s) 750 may comprise, for example, a display (e.g., a display screen), a speaker, and/or a printer.

Data storage device 730 may comprise any appropriate persistent storage device, including combinations of magnetic storage devices (e.g., magnetic tape, hard disk drives and flash memory), optical storage devices, Read Only Memory (ROM) devices, etc., while memory 760 may comprise Random Access Memory (RAM).

Application server 732 may comprise program code executed by processor 710 to cause apparatus 700 to perform any one or more of the processes described herein. Embodiments are not limited to execution of these processes by a single apparatus.

Metadata 734 and data 736 (either cached or a full database) may be stored in volatile memory such as memory 760. Data storage device 730 may also store data and other program code for providing additional functionality and/or which are necessary for operation of apparatus 700, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
   obtaining first text information in a first format;
   converting the first text information to an offset value from a base time in a second format;
   generating an encryption key;
   encrypting the offset value with the encryption key to produce an encrypted offset value in the second format;
   converting the encrypted offset value to second text information in the first format; and
   outputting the second text information as encrypted text corresponding to the first text information.

2. The method of claim 1, further comprising storing metadata associated with the first text information including a key identifier configured to identify the encryption key.

3. The method of claim 2, further comprising decrypting the second text information in the first format based on the metadata, wherein the decrypting further comprises:
   converting the second text information to an offset value from a base time in the second format;

decrypting the offset value with the encryption key to produce a decrypted offset value in the second format; and converting the decrypted offset value to the first text information in the first format.

4. The method of claim 1, wherein the first text information includes date and time information.

5. The method of claim 1, wherein the encryption key is a symmetric encryption key.

6. The method of claim 1, wherein the encrypting step is performed using format-preserving encryption and an Advanced Encryption Standard (AES) encryption key.

7. The method of claim 1, wherein the first text information and the second text information are of the same data type.

8. A system comprising:
a processor; and
a memory in communication with the processor, the memory storing program instructions, the processor operative with the program instructions to perform the operations of:
obtaining first text information of a first data type;
converting the first text information to an epoch time value;
generating an encryption key;
encrypting the epoch time value with the encryption key to produce an encrypted epoch time value;
converting the encrypted epoch time value to second text information having the same data type as the first text information; and
outputting the second text information as encrypted text corresponding to the first text information.

9. The system of claim 8, further comprising storing metadata associated with the first text information including a key identifier configured to identify the encryption key.

10. The system of claim 9, further comprising decrypting the second text information based on the metadata, wherein the decrypting further comprises:
converting the second text information to an epoch time value;
decrypting the epoch time value with the encryption key to produce a decrypted epoch time value; and
converting the decrypted epoch time value to the first text information of the first data type.

11. The system of claim 8, wherein the same key is used for both the encrypting and decrypting.

12. The system of claim 8, wherein the first text information includes date and time information.

13. The system of claim 8, wherein the encrypting step is performed using format-preserving encryption and an Advanced Encryption Standard (AES) encryption key.

14. A non-transitory computer readable medium having stored therein instructions that when executed cause a computer to perform a method comprising:
obtaining first text information;
converting the first text information to an offset value from a base time;
generating an encryption key;
encrypting the offset value with the encryption key to produce an encrypted offset value;
converting the encrypted offset value to second text information; and
outputting the second text information as encrypted text corresponding to the first text information.

15. The non-transitory computer-readable medium of claim 14, further comprising storing metadata associated with the first text information including a key identifier configured to identify the encryption key.

16. The non-transitory computer-readable medium of claim 15, further comprising decrypting the second text information based on the metadata, wherein the decrypting further comprises:
converting the second text information to an offset value from a base time;
decrypting the offset value with the encryption key to produce a decrypted offset value; and
converting the decrypted offset value to the first text information.

17. The non-transitory computer-readable medium of claim 14, wherein the same key is used for both the encrypting and decrypting.

18. The non-transitory computer-readable medium of claim 14, wherein the first text information includes date and time information.

19. The non-transitory computer-readable medium of claim 14, wherein the encrypting step is performed using format-preserving encryption and an Advanced Encryption Standard (AES) encryption key.

20. The non-transitory computer-readable medium of claim 14, wherein the first text information and the second text information are of the same format and length.

* * * * *